United States Patent [19]

Touborg

[11] 4,416,622
[45] Nov. 22, 1983

[54] METHOD AND PLANT SUCH AS A KILN PLANT FOR TREATING GRANULAR OR PULVEROUS RAW MATERIAL

[75] Inventor: Jorn Touborg, Copenhagen, Denmark

[73] Assignee: F. L. Smidth & Co., Cresskill, N.J.

[21] Appl. No.: 323,368

[22] Filed: Nov. 20, 1981

[30] Foreign Application Priority Data

Nov. 25, 1980 [GB] United Kingdom ............... 80377729

[51] Int. Cl.$^3$ .......................... F27B 15/00; F26B 7/02; C04B 7/02
[52] U.S. Cl. ..................................... 432/14; 106/100; 432/106
[58] Field of Search .................... 432/14, 106; 106/100

[56] References Cited

U.S. PATENT DOCUMENTS 4,130,390 12/1978 Kobuyashi et al. .................... 432/14
4,209,296 6/1980 Deussner ............................. 432/14

Primary Examiner—John J. Camby
Attorney, Agent, or Firm—Pennie & Edmonds

[57] ABSTRACT

A method is disclosed for treating granular or pulverous raw material in a kiln plant including a preheater stage, a precalciner stage and a separator stage coupled to one another. Precalcined material is separated after the separator stage into a first and second material flow. The first material flow is suspended in spent cooling air and fed to a reaction zone zone for burning and melting the material therein. The melted material is fed to a cyclone for separating smoke gases therefrom and thereafter to a rotating nodulization drum. The second material flow is also fed to the rotating nudulization drum and mixed therein with the melted material so as to avoid any sticking and clogging of the melt. A kiln for practicing the method of the present invention is also disclosed. In preferred alternative embodiments, the reaction chamber can be either a shaft-like chamber or a cyclone burner.

10 Claims, 2 Drawing Figures

4,416,622

METHOD AND PLANT SUCH AS A KILN PLANT FOR TREATING GRANULAR OR PULVEROUS RAW MATERIAL

TECHNICAL FIELD

The invention relates to a method and an apparatus for burning granular or pulverous raw material for instance cement raw material.

BACKGROUND ART

For many years manufacture of cement and the like has preferentially taken place in kiln plant including a rotary kiln allowing for, compared with shaft kilns, a continuous treatment of raw materials fed to the plant. The development of such rotary kiln plant has through recent times undergone a change towards reducing the size of the mechanically rather complicated kiln construction by arranging some of the previous functions of the rotary kiln to take place in stationary parts of the plant such as separate preheating and precalcining installations. Such plants are known for example from British Patent Specifications Nos. 1,108,589, 1,434,091 and 1,428,828 according to which the rotary kiln carries out two functions in addition to the transport function of treated materials, namely heating from about 900° C. to the reaction temperature in the kiln of the material precalcined in the precalcination zone, and providing retention time in the kiln for the reacting material under treatment.

The next logical step in this development is to move the heating function from the rotary kiln out into a separate, stationary installation thereby making it possible to further reduce the functions of the rotating plant installation. This reduction is desirable due to smaller overall construction costs and a better running or operating economy of the plant. A plant of this type is known from German OLS No. 2,846,584. However, the problem of moving the heating function to a stationary installation may be encumbered by the melting of as much as 20% of the material. Such melting may cause the charge to stick and clog and therefore render the charge difficult to handle during further treatment in the plant.

I have invented a method and a kiln plant where the heating of the treated material to its reaction temperature takes place in a stationary burning installation and where the above mentioned problem concerning transportation of treated material in the plant has been solved.

DISCLOSURE OF THE INVENTION

According to the present invention, a method of treating granular or pulverous raw material, e.g., cement raw material, comprises preheating and precalcining the raw material in suspension; separating the precalcined material from smoke gases; providing two separate subsidiary flows of the precalcined material; feeding one of the subsidiary flows to a stationary burner chamber for burning in suspension and at least partial melting of the material; separating this material from smoke gases and feeding it to a nodulising zone; feeding the other subsidiary material flow to the nodulising zone for mixing with the material from the burning chamber for burning in suspension and at least partial melting of the material; separating this material from smoke gases and feeding it to a nodulising zone; feeding the other subsidiary material flow to the nodulising zone for mixing with the material from the burning chamber whereby the mixed material is subjected to a final reaction and nodulisation during its retention in the nodulising zone; and feeding the material from the nodulising zone to a cooler.

In particular, the method comprises mixing the melted material flow and the second material flow in a rotating nodulisation drum in predetermined proportions such that the heat proper of the mixture is solely sufficient for the final reaction and nodulisation of the treated material.

The present invention also relates to a plant for carrying out the above-mentioned method, the plant being characterised by means for preheating and precalcining the raw material, means for providing the two separate subsidiary material flows, means for leading the one subsidiary flow to a stationary burning chamber, means for separating this material from smoke gases and feeding it to a rotating nodulisation drum defining a nodulisation zone, means for leading the other subsidiary flow directly to the drum for mixing with the material from the burning chamber, and means for leading the nodulised product from the drum to a cooler.

Preferably, the plant for treating pulverous raw materials comprises means for preheating the material in a preheating zone, means for precalcining the preheated material in a precalcination zone, means for separating the precalcined material from smoke gases in a separator zone, means for dividing the separated material into a first material flow and a second material flow, means for suspending the first material flow in cooling air from a cooler, means for burning and melting the suspended first material flow in a generally stationary reaction zone, means for separating the melted material flow from smoke gases, means for feeding the melted material flow to the nodulisation zone, means for feeding the second material flow to the nodulisation zone for mixing with the melted material flow so that the mixture is nodulised therein, and means for feeding the nodulised mixed material flows to a cooler.

After the treatment in a preheating zone for preheating the material, and in a precalcination zone for removal of carbon dioxide from the material, the material is separated and part fed to a reaction zone in a stationary burning chamber where significant burning of the material in suspension and melting takes place. Thereafter the at least partly melted material is separated from the hot gases and fed to a nodulising zone, preferably a rotating nodulising chamber, where the material is mixed with other precalcined material. Powdery precalcined material fed directly to the nodulisating zone coats the melted material particles so that the problem of sticking or clogging is mitigated. The mixture then undergoes a final reaction during its retention in the nodulising zone, the overall temperature of the mixture ensuring that the finished reaction including the nodulisation can preferably take place without the supply of any other heat to the nodulising zone other than that already contained in the material supplied thereto.

The first material flow is preferably suspended in spent cooling air when fed to the burning chamber. The stationary burning chamber may be a shaft-like chamber, or a cyclone burner. In the latter case, the cyclone burner will act both as the burning chamber and as the separator in which the burnt material is separated from the smoke gases before being fed to the nodulising zone. The hot gas from which the burnt material is separated, before being fed to the nodulizing zone, is preferably fed to the precalcination zone for use as combustion air.

Pipes feeding spent cooling air from the cooler to the burning chamber and/or the precalciner, may be provided with movable dampers for regulating the gas streams.

The preheated and precalcined material may be divided into the two subsidiary material flows by the use for example of a splitting gate. Alternatively, the two subsidiary flows may be provided by the use of a two string preheater and precalciner working in parallel.

BRIEF DESCRIPTION OF THE DRAWINGS

The present invention is described in greater detail below with reference to the drawings wherein.

BEST MODE FOR CARRYING OUT THE INVENTION

Figure 1:
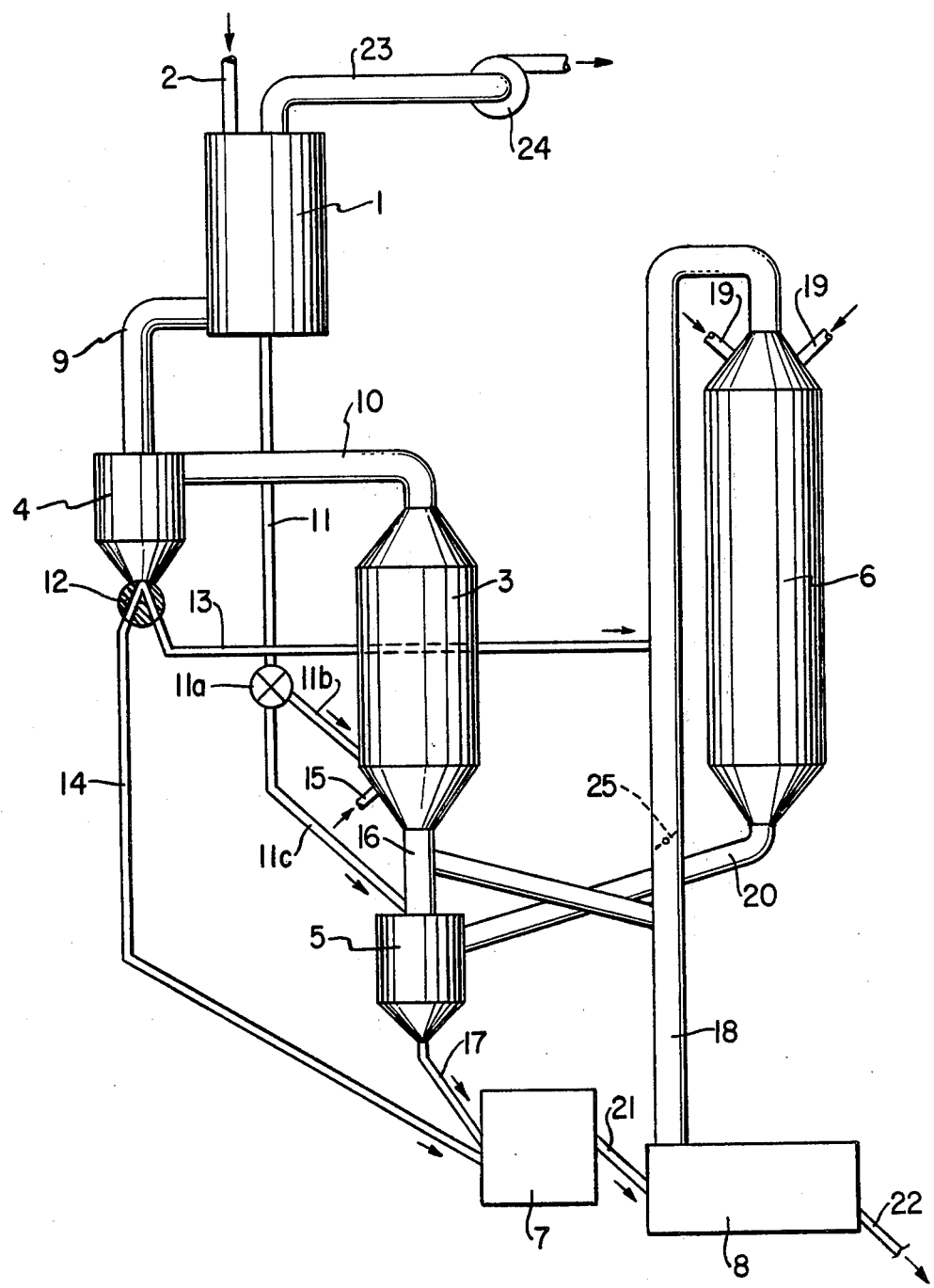
FIG. 1 is a schematic view of one embodiment of the present invention wherein the reaction zone is provided by a shaft-like chamber.

In the FIGS., the same reference numerals are used for identical or like parts of the apparatus according to the present invention.

Raw material is fed to a preheater installation 1 at an inlet 2 the preheater installation being of a known multi-step cyclone type or shaft type. Preheated material leaves the preheater via a pipe 11 and is fed to a precalciner 3, directly through pipe 11b and/or via a pipe 11c and a riser pipe 16. Flow through pipes 11b and 11c is regulated by a valve 11a. Fuel is fed at 15 to the precalciner 3 and combustion air is supplied through the pipe 16 and a pipe 18. Precalcined material leaves the precalciner 3 in suspension via pipe 10 and is separated from the hot smoke gases in a separator 4. The hot smoke gases are fed to the preheater installation 1 via a pipe 9 and are drawn through the preheater by a fan 24 in an exhaust pipe 23.

Separated, precalcined material is, at a splitting gate 12 immediately after the separator 4, divided into two subsidiary flows. One of these flows, amounting to 25-75% of the total is, via a pipe 13, led to the pipe 18 for suspension in spent cooling air from a cooler 8. The suspension is fed to a vertical, tubular or shaftlike burning or reaction chamber 6 as shown in FIG. 1 for burning and melting the material. The chamber has fuel inlets and burners 19. Melted material and smoke gases leave the reaction chamber 6 through a pipe 20 leading to a cyclone 5 in which the melt is separated from the smoke gases. The latter are fed as combustion air to the precalciner 3 via the pipe 16 as mentioned above, whereas the melt, via a pipe 17, is fed to a rotating nodulisation drum 7. The other subsidiary, precalcined, powdery material flow, amounting to 75-25% of the total is, via the splitting gate 12 and a pipe 14, fed directly to the inlet of the drum 7 to be mixed in the drum with the melt. This mixing prevents the risk of sticking and clogging of the melt during its treatment in the drum 7. Also, the heat proper contained in the melt and in the subsidiary second material flow respectively ensures that the final reaction in the form of nodulisation of the product in the drum 7 takes place. The product leaves the drum 7 through a pipe 21 and is fed to the cooler 8, from which it leaves as the final product at 22.

Figure 2:
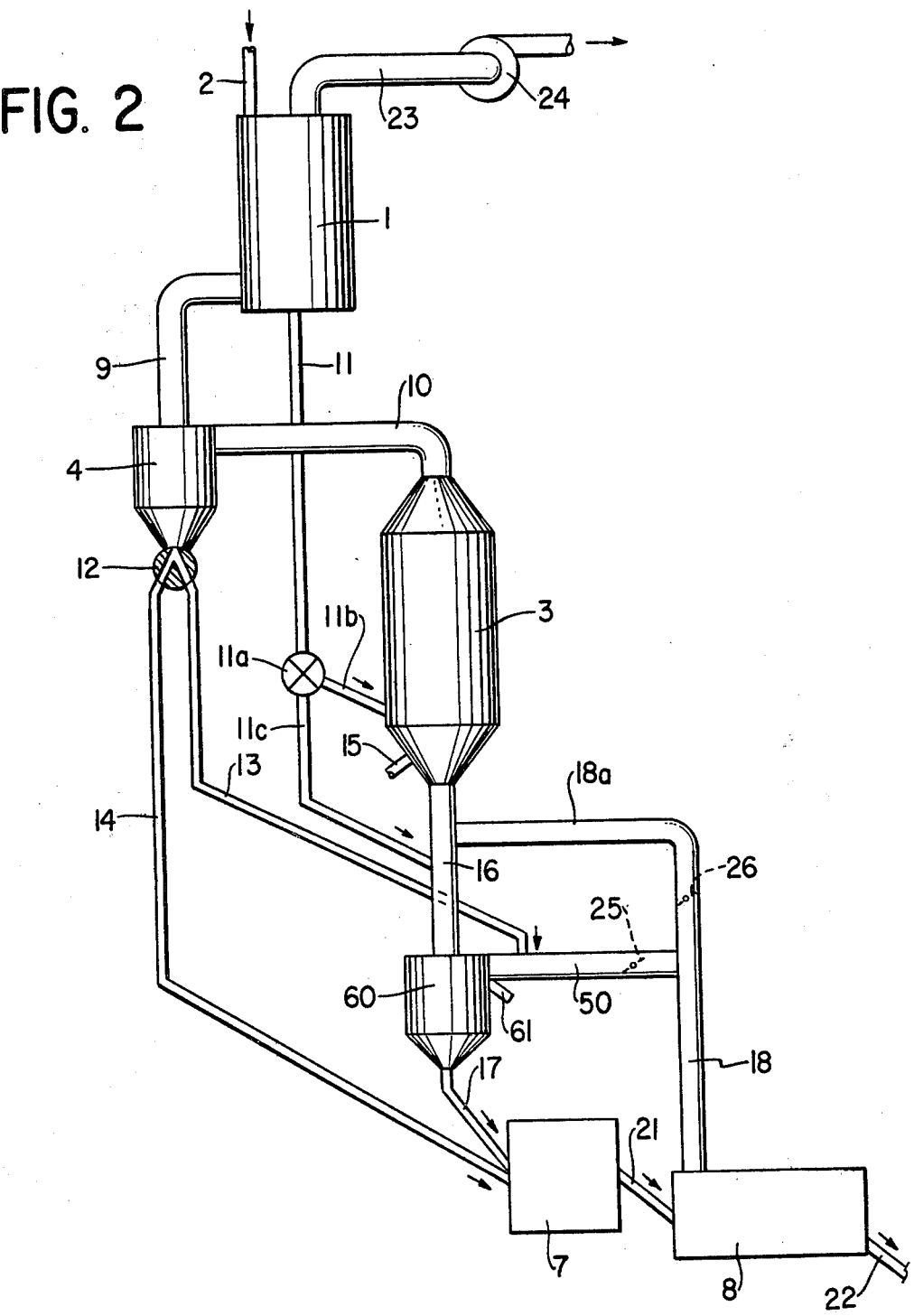
FIG. 2 is a schematic view of an alternative embodiment of the present invention wherein the reaction zone is provided by a cyclone burner.

In the embodiment shown in FIG. 2 the reaction zone for burning and melting the treated material is a cyclone burner 60 instead of the shaft-like chamber 6. The cyclone burner 60 has a fuel inlet and a burner installation 61, and precalcined material to be treated in the reaction zone is fed to an upper part 50 of the pipe 18 for suspension here in spent cooling air from the cooler 8 before being fed to the cyclone burner 60. Also, in this case the spent cooling air acts as combustion air both in the cyclone burner 60 and in the precalciner 3.

Movable dampers 25 and 26 are used for regulating the combustion air supply to the reaction zones 6, 60, and the precalciner 3.

I claim:

1. Method for treating pulverous raw materials in a kiln plant including a generally stationary reaction zone coupled upstream to a preheating zone and a precalcination zone and downstream to a cooler, comprising preheating the material in the preheating zone in suspension, precalcining the preheated material in the precalcination zone in suspension, separating the precalcined material from smoke gases in a separator zone, dividing the precalcined separated material into a first material flow and a second material flow, suspending the first material flow in cooling air from the cooler, burning and melting the suspended first material flow in the generally stationary reaction zone, separating the melted first material flow in a cyclone from smoke gases, feeding the melted material flow to a rotating nodulisation drum coupled downstream of the cyclone, feeding the smoke gases separated from the melted first material flow to the precalcination zone as combustion air, feeding the second material flow directly to the rotating nodulisation drum for mixing with the melted material flow so that the mixture is nodulised therein, and feeding the nodulised mixed material flows to the cooler.

2. Method according to claim 1 comprising mixing the melted material flow and the second material flow in the rotating nodulisation drum in predetermined proportions such that the heat proper of the mixture is solely sufficient for the final reaction and nodulisation of the treated material.

3. Method for treating granulated or pulverous raw materials, for instance for the manufacture of cement and the like, in a stationary or a nearly stationary kiln plant, which plant comprises a stationary burning installation before which are coupled partly a preheating zone and partly a precalcination zone for preheating and precalcining in suspension the treated material, and after which is coupled a cooler, and where the precalcined material is separated from smoke gases in at least one separator adjacent to the precalcination zone, characterized by dividing the precalcined, separated material into two separate subsidiary material flows, suspending one subsidiary flow in spent cooling air and feeding said one subsidiary flow to the burning installation for burning in suspension and melting, feeding the melt and the smoke gases to a cyclone for separation, feeding the melt from the cyclone to a rotating nodulisation drum coupled after the cyclone, while feeding the smoke gases to the precalcination zone as combustion air, and feeding the other subsidiary powdery flow directly to the inlet of the drum, to be mixed in same drum with the melt, subjecting the mix to a final reaction and nodulisation during its retention in the drum and then feeding the product after nodulisation to the cooler.

4. Method according to claim 3, characterized by mixing the melt and the other subsidiary precalcined powdery material flow in the rotating nodulisation drum in proportions allowing for the temperature proper of the mixture being sufficient for the final reaction and nodulisation of the treated material without supplying any other heat to the drum than the heat already contained in the melt and said other subsidiary material flow respectively.

5. Kiln plant for treating pulverous raw materials comprising a rotating nodulisation drum, a generally stationary reaction zone coupled upstream to a preheater and a precalciner and downstream to a cooler, the preheater and the precalciner adapted for preheating and precalcining, respectively, the material in suspension, means for separating the precalcined material from smoke gases, means for dividing the precalcined separated material into a first material flow and a second material flow, means for suspending the first material flow in cooling air from the cooler, means for burning and melting the suspended first material flow in the generally stationary reaction zone, means for separating the melted first material flow from smoke gases, means for feeding the melted material flow to the rotating nodulisation drum coupled downstream of the separating means, means for feeding the smoke gases separated from the melted first material flow to the precalcination zone as combustion air, means for feeding the second material flow directly to the rotating nodulisation drum for mixing with the melted material flow so that the mixture is nodulised therein, and means for feeding the nodulised mixed material flows to the cooler.

6. Kiln plant according to claim 5 wherein predetermined portions of the melted material flow and the second material flow are mixed in the rotating nodulisation drum such that the heat of the mixture is solely sufficient for the final reaction and nodulisation of the treated material.

7. Kiln plant according to claim 5 wherein the generally stationary reaction zone is a shaft-like chamber.

8. Kiln plant according to claim 5 wherein the generally stationary reaction zone is a cyclone burner.

9. The kiln plant according to claim 7 wherein the suspending means includes at least one movable damper for regulating the supply of combustion air to the generally stationary reaction zone.

10. Plant according to claim 5 characterized in that said dividing means is a splitting gate.

* * * * *